US007266578B2

(12) United States Patent
Takagi (10) Patent No.: US 7,266,578 B2
(45) Date of Patent: Sep. 4, 2007

(54) METHOD AND HARDWARE FOR COMPUTING RECIPROCAL SQUARE ROOT AND PROGRAM FOR THE SAME

(75) Inventor: Naofumi Takagi, Kyoto (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 789 days.

(21) Appl. No.: 10/160,966

(22) Filed: May 31, 2002

(65) Prior Publication Data
US 2003/0028574 A1    Feb. 6, 2003

(30) Foreign Application Priority Data
May 31, 2001    (JP)    ............... 2001-165098

(51) Int. Cl.
*G06F 7/38* (2006.01)
(52) U.S. Cl. .................................... 708/605
(58) Field of Classification Search .............. 708/605, 708/500–501
See application file for complete search history.

(56) References Cited

U.S. PATENT DOCUMENTS 5,253,215 A * 10/1993 Lindsley .................. 708/605
5,307,302 A * 4/1994 Nakano .................... 708/605
6,163,791 A * 12/2000 Schmookler et al. ...... 708/502
6,175,907 B1 * 1/2001 Elliott et al. ............. 708/502
2001/0010051 A1 * 7/2001 Oberman et al. .......... 708/502

OTHER PUBLICATIONS

Lang, T., and E. Antelo, "Correctly Rounded Reciprocal Square-Root by Digit Recurrence and Radix-4 Implementation," *Proceedings of 15th IEEE Symposium on Computer Arithmetic*, Vail, Colorado, Jun. 11-13, 2001, pp. 83-93.

* cited by examiner

*Primary Examiner*—Tan V. Mai
(74) *Attorney, Agent, or Firm*—Christensen O'Connor Johnson Kindness PLLC (57) ABSTRACT

A reciprocal square root for a radix of $r$ is calculated when S[j] represents the partial result obtained after $j$ iterations of calculation, W[j], a residual, and P[j], the product of an operand X and the S[j]. Firstly, appropriate values are set to the initial values S[0], W[0], and P[0]. Secondly, $n$ iterations of calculations from $j=0$ to $n-1$ are performed. One calculation includes selecting a reciprocal square root digit $q_{j+1}$ from the digit set $\{-a, \ldots, -1, 0, 1, \ldots, a\}$, and calculating a recurrence equation of the S[j], i.e., $S[j+1]:=S[j]+q_{j+1}r^{-j-1}$, a recurrence equation of the W[j], i.e., $W[j+1]:=rW[j]-(2P[j]+Xq_{j+1}r^{-j-1})q_{j+1}$, and a recurrence equation of the P[j], i.e., $P[j+1]:=P[j]+Xq_{j+1}r^{-j-1}$.

2 Claims, 5 Drawing Sheets

METHOD AND HARDWARE FOR COMPUTING RECIPROCAL SQUARE ROOT AND PROGRAM FOR THE SAME

CROSS-REFERENCE TO RELATED APPLICATIONS

This application is based upon and claims the benefit of priority from the prior Japanese Patent Application No. 2001-165098, filed May 31, 2001, the entire contents of which are incorporated herein by reference.

BACKGROUND OF THE INVENTION

1. Field of the Invention

The present invention relates to a method of computing a reciprocal square root, a reciprocal square rooting circuit, and a program for causing a computer to compute a reciprocal square root.

2. Description of the Related Art

Reciprocal square rooting circuits are disclosed in Jpn. Pat. Appln. KOKAI Publication Nos. 03-138725 and 09-319561. Jpn. Pat. Appln. KOKAI Publication No. 03-138725 discloses a multiplication type reciprocal square rooting circuit using Newtonian laws. Jpn. Pat. Appln. KOKAI Publication No. 09-319561 discloses a reciprocal square rooting circuit which has subtraction shift type dividers and square root extractors connected in series with each other and is designed to perform square root extraction in parallel with division.

The circuit disclosed in Jpn. Pat. Appln. KOKAI Publication No. 03-138725 uses multipliers and an initial value memory, and hence an increase in circuit size is inevitable.

According to Jpn. Pat. Appln. KOKAI Publication No. 09-319561, square root extraction is performed in one step per two cycles while division is performed, and square root extraction is performed in one step per cycle after division, resulting in a high latency.

BRIEF SUMMARY OF THE INVENTION

It is, therefore, an object of the present invention to provide a method of computing a reciprocal square root, a reciprocal square rooting circuit, and a program, which realize a smaller amount of hardware than a conventional multiplication type reciprocal square rooting circuit and also realize faster operation than a conventional reciprocal square rooting circuit using dividers and square root extractors.

In order to achieve the above object, according to the first aspect of the present invention, there is provided a method of calculating a reciprocal square root by using a digit selection circuit, 1-digit multipliers, adders, and a converter when a radix is $r$ in a computer system, comprising the steps of:

when $S[j]$ is a partial result obtained after $j$ iterations of calculation, $W[j]$ is a residual, and $P[j]$ is a product of an operand X and the partial result $S[j]$, setting appropriate values to initial values $S[0]$, $W[0]$, and $P[0]$; and performing $n$ iterations of calculations from $j=0$ to $n-1$, including selecting a reciprocal square root digit $q_{j+1}$ from a digit set $\{-a, \ldots, -1, 0, 1, \ldots, a\}$ by using the digit selection circuit, and calculating a recurrence equation of the partial result $S[j]:S[j+1]:=S[j]+q_{j+1}r^{-j-1}$, a recurrence equation of the residual $W[j]:W[j+1]:=rW[j]-(2P[j]+Xq_{j+1}r^{-j-1})q_{j+1}$, and a recurrence equation of the product $P[j]:P[j+1]:=P[j]+Xq^{j+1}r^{-j-1}$ by using the 1-digit multipliers, the adders, and the converter.

According to the second aspect of the present invention, there is provided a method of calculating a reciprocal square root by using a digit selection circuit, 1-digit multipliers, adders, and a converter when a radix is 2 in a computer system, comprising the steps of:

when $S[j]$ is a partial result obtained after $j$ iterations of calculation, $W[j]$ is a residual, and $P[j]$ is a product of an operand X ($\frac{1}{4}<X<1$) and the partial result $S[j]$, setting 1, 1-X, and X to initial values $S[0]$, $W[0]$, and $P[0]$, respectively; and performing $n$ iterations of calculations from $j=0$ to $n-1$, including selecting a reciprocal square root digit $q_{j+1}$ from a digit set $\{-1, 0, 1\}$ by using the digit selection circuit in accordance with an estimate of $2W[j]$, obtaining $S[j+1]$ from the partial result $S[j]$ by using the converter, and calculating a recurrence equation of the residual $W[j]:W[j+1]:=2W[j]-(2P[j]+Xq_{j+1}2^{-j-1})q_{j+1}$ and a recurrence equation of the product $P[j]:P[j+1]:=P[j]+Xq_{j+1}2^{-j-1}$ by using the 1-digit multipliers and the adders.

According to the third aspect of the present invention, there is provided a method of calculating a reciprocal square root by using a digit selection circuit, 1-digit multipliers, adders, and a converter when a radix is 4 in a computer system, comprising the steps of:

when $S[j]$ is a partial result obtained after $j$ iterations of calculation, $W[j]$ is a residual, and $P[j]$ is a product of an operand X ($\frac{1}{4}<X<1$) and the partial result $S[j]$, setting 2, 1-4X, and 2X to initial values $S[0]$, $W[0]$, and $P[0]$, respectively, when the operand X is smaller than $\frac{3}{8}$, setting $\frac{3}{2}$, $1-9X/4$, and $3X/2$ to the initial values $S[0]$, $W[0]$, and $P[0]$, respectively, when the operand X is in a range of $\frac{3}{8}$ (inclusive) and $\frac{3}{4}$ (exclusive), and setting 1, 1-X, and X to the initial values $S[0]$, $W[0]$, and $P[0]$, respectively, when the operand X is not less than $\frac{3}{4}$, performing $n$ iterations of calculations from $j=0$ to $n-1$, including selecting a reciprocal square root digit $q_{j+1}$ from a digit set $\{-2, -1, 0, 1, 2\}$ by using the digit selection circuit in accordance with estimates of $4W[j]$ and $P[j]$, obtaining $S[j+1]$ from the partial result $S[j]$ by using the converter, and calculating a recurrence equation of the residual $W[j]:W[j+1]:=4W[j]-(2P[j]+Xq_{j+1}4^{-j-1})\,q_{j+1}$ and a recurrence equation of the product $P[j]:P[j+1]:=P[j]+Xq_{j+1}4^{-j-1}$ by using the 1-digit multipliers and the adders.

According to the fourth aspect of the present invention, there is provided a reciprocal square rooting circuit for computing a reciprocal square root for a radix of $r$ by using a partial result $S[j]$, a residual $W[j]$, and a product $P[j]$ of an operand X and the partial result $S[j]$ after $j$ iterations of calculation, comprising:

as components of a circuit for performing one iteration of $n$ iterations of calculation for $j=0$ to $n-1$ by using predetermined recurrence equations, a digit selection circuit which determines a reciprocal square root digit $q_{j+1}$ from values of most significant several bits of $rW[j]$ and $P[j]$;

a first 1-digit multiplier which generates $Xq_{j+1}$ by multiplying the operand X by an output from the digit selection circuit;

a first carry-save adder which adds $2P[j]$ and an output from the first 1-digit multiplier;

a second 1-digit multiplier which multiplies an output from the first carry-save adder by an output from the digit selection circuit;

a second carry-save adder which calculates W[j+1] by adding rW[j] and an output from the second 1-digit multiplier;

a third carry-save adder which adds P[j] and an output from the first 1-digit multiplier; and a converter which converts S[j] into S[j+1] in accordance with the output from the digit selection circuit.

According to the fifth aspect of the present invention, the reciprocal square rooting circuit according to the fourth aspect of the present invention further comprises a register to store a value of S[j], a register to store a value of W[j], a register to store a value of P[j], and a register to store X.

According to the sixth aspect of the present invention, there is provided a program which causes a computer to implement a function of computing a reciprocal square root for a radix of $r$ by using a partial result S[j] obtained after $j$ iterations of calculation, a residual W[j], and a product P[j] of an operand X and the partial result S[j], the function including a function of setting appropriate values to initial values S[0], W[0], and P[0], and a function of performing $n$ iterations of calculations from j=0 to n−1, including selecting a reciprocal square root digit $q_{j+1}$ from a digit set $\{-a, \ldots, -1, 0, 1, \ldots, a\}$, and calculating a recurrence equation of the partial result $S[j]:S[j+1]:=S[j]+q_{j+1}r^{-j-1}$, a recurrence equation of the residual $W[j]:W[j+1]:=rW[j]-(2P[j]+Xq_{j+1}r^{-j-1})\,q_{j+1}$, and a recurrence equation of the product $P[j]:P[j+1]:=P[j]+Xq_{j+1}r^{-j-1}$.

According to the seventh aspect of the present invention, there is provided a program which causes a computer to implement a function of computing a reciprocal square root for a radix of 2 by using a partial result S[j] obtained after $j$ iterations of calculation, a residual W[j], and a product P[j] of an operand X (¼<X<1) and the partial result S[j], the function including a function of setting 1, 1−X, and X to initial values S[0], W[0], and P[0], respectively; and a function of performing $n$ iterations of calculations from j=0 to n−1, including selecting a reciprocal square root digit $q_{j+1}$ from a digit set $\{-1, 0, 1\}$ in accordance with an estimate of 2W[j], obtaining S[j+1] from the partial result S[j], and performing addition by using a recurrence equation of the residual $W[j]: W[j+1]:=2W[j]-(2P[j]+Xq_{j+1}2^{-j-1})q_{j+1}$ and a recurrence equation of the product $P[j]:P[j+1]:=P[j]+Xq_{j+1}2^{-j-1}$.

According to the eighth aspect of the present invention, there is provided a program which causes a computer to implement a function of computing a reciprocal square root for a radix of 4 by using a partial result S[j] obtained after $j$ iterations of calculation, a residual W[j], and a product P[j] of an operand X (¼<X<1) and the partial result S[j], the function including a function of setting 2, 1−4X, and 2X to initial values S[0], W[0], and P[0], respectively, when the operand X is smaller than ⅜, setting 3/2, 1−9X/4, and 3X/2 to the initial values S[0], W[0], and P[0], respectively, when the operand X is in a range of ⅜ (inclusive) and ¾ (exclusive), and setting 1, 1−X, and X to the initial values S[0], W[0], and P[0], respectively, when the operand X is not less than ¾, and a function of performing $n$ iterations of calculations from j=0 to n−1, including selecting a reciprocal square root digit $q_{j+1}$ from a digit set $\{-2, -1, 0, 1, 2\}$ in accordance with estimates of 4W[j] and P[j], obtaining S[j+1] from the partial result S[j], and performing addition by using a recurrence equation of the residual $W[j]: W[j+1]:=4W[j]-(2P[j]+Xq_{j+1}4^{-j-1})q_{j+1}$ and a recurrence equation of the product $P[j]:P[j+1]:=P[j]+Xq_{j+1}4^{-j-1}$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

1. A hardware algorithm for computing a reciprocal square root with a radix $r$ will be described first. Consider the computation of a mantissa part in computing the reciprocal square root of a floating point number. With respect to an operand X defined by ¼<X<1, $S=X^{-1/2}$ is obtained as its reciprocal square root. In this case, $1<X^{-1/2}<2$. Assume that X represents an n-digit r-ary fraction, and the r is the power of 2, i.e., $r=s^b$.

$$-r^{-n} < X^{-1/2} - S < r^{-n} \quad (1)$$

S that satisfies inequality (1) is calculated down to the nth place as an r-ary number.

In this case, as in the calculation of a square root or the like, a reciprocal square root digit $q_j$ is obtained digit by digit from the most significant one. Letting S[j] be the partial result after j iterations, then $$S[j] = s[0] + \sum_{i=1}^{j} q_i r^{-i}$$

where S[0] is the initial value of the partial result.

The recurrence equation of the partial result is $$S[j+1]:=S[j]+q_{j+1}r^{-j-1} \quad (2)$$

A reciprocal square root digit $q_{j+1}$ is selected from a redundant digit set $\{-a, \ldots, -1, 0, 1, \ldots, a\}$ where $r/2 \leq a < r$. The final result is $$S = S[n] = S[0] + \sum_{i=1}^{n} q_i r^{-i}$$

The result is computed with n-digit precision.

That is, S that satisfies inequality (1) is obtained.

A residual (or scaled partial remainder) W[j] is defined as $$W[j] = r^j(1 - X \cdot S[j]^2) \qquad (3)$$

Substituting j+1 for j in equation (3) yields $W[j+1] = r^{j+1}(1 - X \cdot S[j+1]^2)$. From equations (2) and (3), the recurrence equation of the residual is obtained as follows:

$$W[j+1] := rW[j] - 2X \cdot S[j] q_{j+1} - X q_{j+1}^2 r^{-j-1} \qquad (4)$$

Since this equation includes the term $-2X \cdot S[j] q_{j+1}$, multiplication of an n-digit number X and a j-digit number S[j] is required for the calculation. To avoid the multiplication, $X \cdot S[j]$ is stored and updated by a shift, addition and subtraction, and 1-digit multiplication.

$X \cdot S[j]$ is defined as P[j]. The recurrence equation of W[j] is then rewritten as $$W[j+1] := rW[j] - q_{j+1}(2P[j] + X q_{j+1} r^{-j-1}) \qquad (5)$$

In addition, the recurrence equation of P[j] is $$P[j+1] := P[j] + X q_{j+1} r^{-j-1} \qquad (6)$$

A method of selecting $q_{j+1}$ will be described later.

From inequality (1), $(S - r^{-n})^2 < X^{-1} < (S + r^{-n})^2$ must hold.

$$S = S[j] + \sum_{i=j+1}^{n} q_i r^{-i}$$

Since the minimum and maximum reciprocal square root digit values are $-a$ and $a$, the above equation is rewritten as $(S[j] - r^{-j}\rho)^2 < X^{-1} < (S[j] + r^{-j}\rho)^2$ where $\rho = a/(r-1)$ is the redundancy factor of the reciprocal square root digit set. Therefore, according to equation (3), as the condition which W[j] should satisfied, the following inequality is obtained:

$$-2X \cdot S[j]\rho + X\rho^2 r^{-j} < W[j] < 2X \cdot S[j]\rho + X\rho^2 r^{-j} \qquad (7)$$

At the beginning of the computation, equation (8) must be satisfied for j=0:

$$-2X \cdot S[0]\rho + X\rho^2 < W[0] = 1 - X \cdot S[0]^2 < 2X \cdot S[0]\rho + X\rho^2 \qquad (8)$$

Since $2^{-2} < X < 1$, equation (8) can be satisfied by, for example, letting $S[0] = 3/2$ and $W[0] = 1 - 9X/4$. In this case, $P[0] = 3X/2$. When $\rho = 1$, $S[0] = 1$ and $W[0] = 1 - X$ can also be set.

The algorithm for computing the reciprocal square root is comprised of n iterations of calculation of the recurrence equations (2), (5), and (6) for the radix of r. The algorithm can be summarized as follows:

Algorithm[RSQRT]

Step 1:
    Set the appropriate values to S[0], W[0], and P[0];
Step 2:
    for j:=0 to n−1 do {
    Select $q_{j+1}$ from $\{-a, \ldots, -1, 0, 1, \ldots, a\}$:
    $S[j+1] := S[j] + q_{j+1} r^{-j-1}$;
    $W[j+1] := rW[j] - (2P[j] + X q_{j+1} r^{-j-1}) q_{j+1}$;
    $P[j+1] := P[j] + X q_{j+1} r^{-j-1}$;
}

Figure 1:
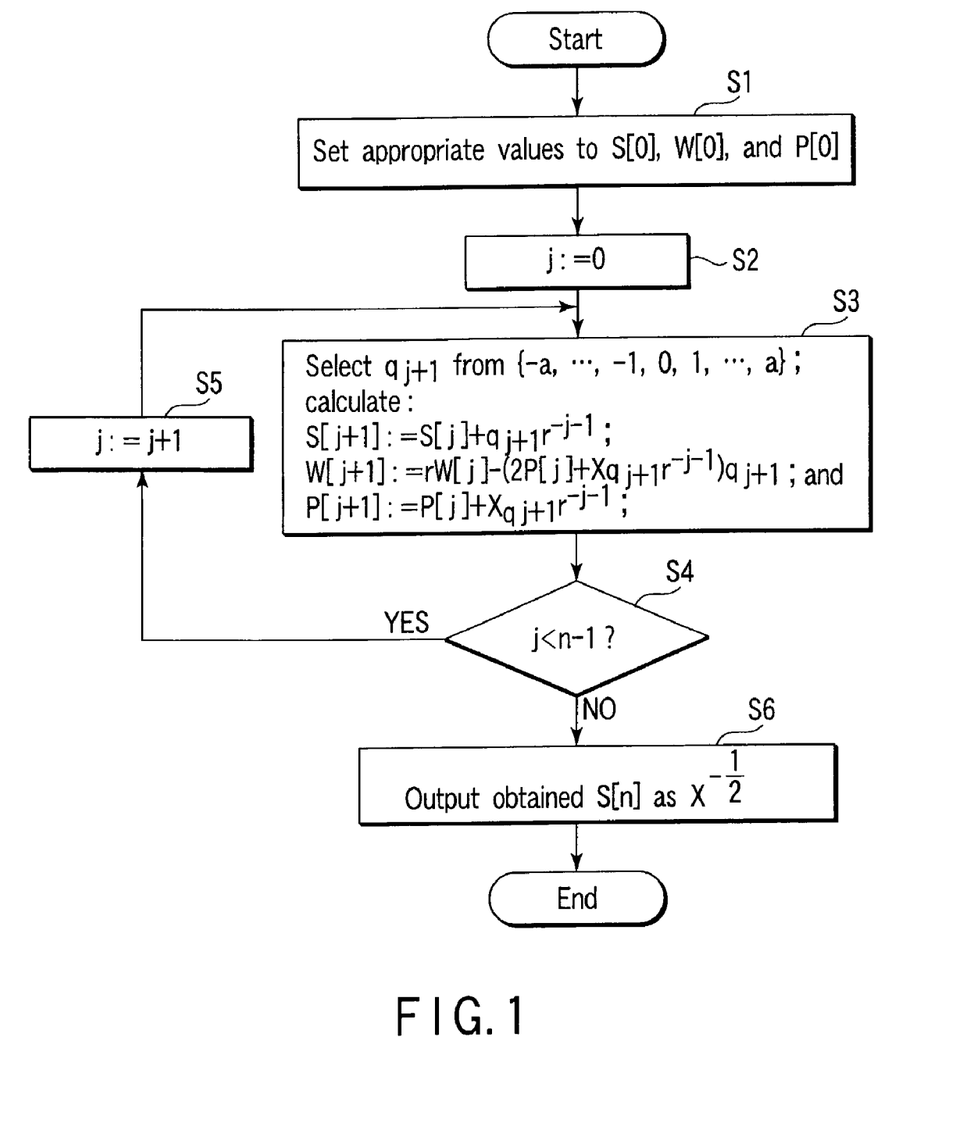
FIG. 1 is a flow chart showing an algorithm for computing a reciprocal square root when the radix is $r$.

FIG. 1 is a flow chart showing the above algorithm for computing the reciprocal square root. First of all, appropriate values are set to the initial values S[0], W[0], and P[0] (step S1). The reciprocal square root digit $q_{j+1}$ is selected from the redundant digit set $\{-a, \ldots, -1, 0, 1, \ldots, a\}$. n iterations of the recurrence equation of the partial result S[j], i.e., $S[j+1] := S[j] + q_{j+1} r^{-j-1}$, the recurrence equation of the residual W[j], i.e., $W[j+1] := rW[j] - (2P[j] + X q_{j+1} r^{-j-1}) q_{j+1}$, and the recurrence equation of the product P[j], i.e., $P[j+1] := P[j] + X q_{j+1} r^{-j-1}$ are performed from j=0 to n−1 (steps S2 to S5). The obtained value S[n] is then output as the reciprocal square root of the operand X (step S6).

$X^{-1/2}$ is obtained as S[n]. Since S[n] is in the r-ary signed-digit representation (r-ary SD representation), it must be converted into an ordinary binary representation. This conversion may be performed at the end of the computation or may be performed concurrently with the computation by the on-the-fly conversion used in existing dividers and the like. As P[n], $X^{1/2}$ is also obtained.

The speed of the computation can be greatly increased with a small increase in hardware by performing additions/subtractions appearing in the recurrence equations by the use of a redundant representation without carry propagation. Consider therefore implementation using the redundant representation. That is, the residual W[j], partial result S[j], and product P[j] of the operand X and S[j] are expressed in a carry-save form or binary SD representation, and additions/subtractions appearing in these recurrence equations are performed without carry propagation.

The selection of a reciprocal square root digit will be described below.

The reciprocal square root digit $q_{j+1}$ is selected from the redundant digit set $\{-a, \ldots, -1, 0, 1, \ldots, a\}$ so that W[j+1] satisfies $$-2X \cdot S[j+1]\rho + X\rho^2 r^{-j-1} < W[j+1] < 2X \cdot S[j+1]\rho + X\rho^2 r^{-j-1} \qquad (9)$$

Note that $q_{j+1}$ depends on rW[j], X, and S[j].

Letting $(L_k[j], U_k[j])$ be the range of rW[j] in which k $(=-a, -a+1, \ldots, a)$ can be selected as $q_{j+1}$, then $$L_k[j] = 2X \cdot S[j](k - \rho) + X(k - \rho)^2 r^{-j-1} \qquad (10)$$

$$U_k[j] = 2X \cdot S[j](k + \rho) + X(k + \rho)^2 r^{-j-1} \qquad (11)$$

Note that the lower bound of the range for k=−a and the upper bound of the range for k=a are equal to the lower and upper bounds of rW[j], respectively.

The range of rW[j] in which k−1 is selected as $q_{j+1}$ must be continuous with the range in which k is selected. Hence, $U_{k-1}[j] > L_k[j]$ needs to be satisfied. That is, $$(2\rho - 1)(2X \cdot S[j] + X(2k-1) r^{-j-1}) > 0 \qquad (12)$$

needs to be satisfied. This inequality is always satisfied. The left-hand side of inequality (12) represents the overlap between adjacent selection ranges. The digit selection function can be simplified by using this overlap. More specifically, although $q_{j+1}$ depends on rW[j], X, and S[j], $q_{j+1}$ can be determined from estimates (most significant several bits) of rW[j], X, and S[j].

Since $P[j] = X \cdot S[j]$, equations (10) and (11) can be rewritten as $$L_k[j]=2P[j](k-\rho)+X(k-\rho)^2 r^{-j-1} \quad (13)$$

$$U_k[j]=2P[j](k+\rho)+X(k+\rho)^2 r^{-j-1} \quad (14)$$

Therefore, $q_{j+1}$ can be determined from the estimates of rW[j], X, and P[j]. Since the second terms of the right-hand sides of (13) and (14) rapidly decrease as $j$ increases, the digit selection function can be made independent of X except for a few, if any, small j's.

Let $rW[j]_e$ and $P[j]_e$ be the estimates of rW[j] and P[j]. Assume that $rW[j]_e$ and $P[j]_e$ are obtained by truncating rW[j] and P[j] to $t$ and $d$ factional bits, respectively (Note that they are not r-ary digits but binary bits). The digit selection function is expressed by a set of threshold values:

$$\{m_k(P[j]_e)|k\in\{-a+1,\ldots,-1,0,1,\ldots,a\}\}$$

In this case, if $m_k(P[j]_e) \leq rW[j]_e < m_{k+1}(P[j]_e)$, then $k$ is selected as $q_{j+1}$.

If W[j] is expressed in the carry-save form and the value obtained by truncating rW[j] to $t$ fractional bits is used as $rW[j]_e$ without any change, then $rW[j]_e \leq rW[j] < rW[j]_e + 2^{-t+1}$. Therefore, $m_k(P[j]_e) > {}^{max}P[j]_e(L_k[j])$ and $m_k(P\{j\}_e)-2^{-t}+2^{-t+1} \leq \min_{P[j]e}(U_{k-1}[j])$ must be established. That is, $${}^{max}P[j]_e(L_k[j]) < m_k(P[j]_e) < \min_{P[j]e}(U_{k-1}[j])-2^{-t} \quad (15)$$

must be satisfied. In this case, ${}^{max}P[j]_e(L_k[j])$ represents the lower bound of the range of rW[j] in which $k$ can be selected as $q_{j+1}$ when the estimate of P[j] is $P[j]_e$, and ${}^{min}P[j]_e(U_{k-1}[j])$ represents the upper bound of the range of rW[j] in which k−1 can be selected as $q_{j+1}$. $P[i]_e$ must be a multiple of $2^{-t}$ that satisfies inequality (15). Note that the maximum value of $rW[j]_e$ for which k−1 is selected as $q_{j+1}$ is $m_k(P[j]_e)-2^{-t}$. The necessary condition for the minimum overlap required for a feasible digit selection is $${}^{min}P[j]_e(U_{k-1}[j]) - {}^{max}P[j]_e(L_k[j]) > 2^{-t} \quad (16)$$

When P[j] is expressed in the carry-save form and the value obtained by truncating P[j] to $d$ fractional bits is used as $P[j]_e$, $P[j]_e \leq P[j] \leq P[j]_e + 2^{-d+1}$. According to equations (13) and (14), therefore, for k >0, $${}^{max}P[j]_e(L_k[j]) < 2(P[j]_e + 2^{-d+1})(k-\rho) + X(k-\rho)^2 r^{-j-1},$$

$${}^{min}P[j]_e(U_{k-1}[j]) = 2P[j]_e(k-1+\rho) + X(k-1+\rho)^2 r^{-j-1} \quad (17)$$

For $k \leq 0$, $${}^{max}P[j]_e(L_k[j]) = 2P[j]_e(k-\rho) + X(k-\rho)^2 r^{-j-1},$$

$${}^{min}P[j]_e(U_{k-1}[j]) > 2(P[j]_e + 2^{-d+1})(k-1+\rho) + X(k-1+\rho)^2 r^{-j-1} \quad (18)$$

A digit selection function may be determined from these values. Since they depend on $j$, a different digit selection function may be determined for different $j$. In practice, a common selection function can be obtained except for a few, if any, small j's.

Various different specific algorithms can be designed on the basis of this algorithm by setting the radix $r$, the redundancy factor ρ of the reciprocal square root digit set, the type of representation of the residual W[j] and the product P[j] of operand X and partial result S[j], (carry-save form or binary SD representation), a digit selection function, and the like.

Consider circuit implementation in general. A reciprocal square rooting circuit based on the above algorithm can be implemented as a combinational circuit or a sequential circuit. Pipelining can also be used.

Figure 2:
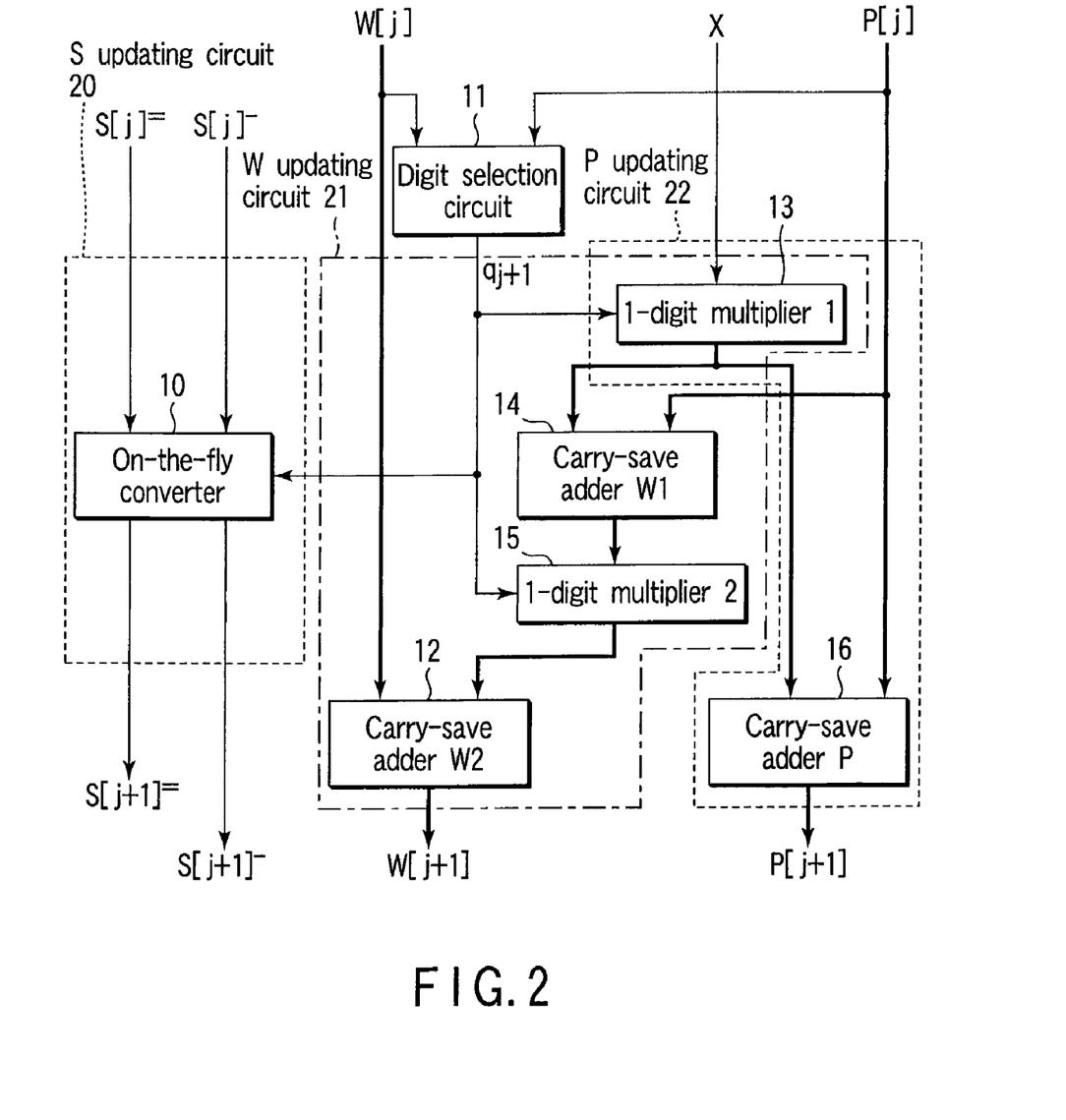
FIG. 2 is a block diagram showing a circuit for performing one iteration of calculation of step 2.

First, consider a circuit for performing one iteration of Step 2. The block diagram of FIG. 2 shows the arrangement of this circuit. Assume that W[j] and P[j] are expressed in the carry-save form and that the on-the-fly conversion is used and binary expression $S[j]^=$ of S[j] and binary expression $S[j]^-$ of $S[j]-2^{-j}$ are held.

Referring to FIG. 2, a digit selection circuit 11 is a digit selection circuit for determining $q_{j+1}$ from the values of the most significant several bits of rW[j] and P[j]. A 1-digit multiplier 1 (13) is a multiplier with a 1-digit multiplier factor, which produces $Xq_{j+1}$ by multiplying the shifted operand X by the output $q_{j+1}$ from the digit selection circuit 11. Carry-save adders W1 (14) are several carry-save adders for adding 2P[j] and the output from the 1-digit multiplier 1 (13).

A 1-digit multiplier 2 (15) is a multiplier with a 1-digit multiplier factor, which multiplies the output from the carry-save adder W1 (14) by the output $q_{j+1}$ from the digit selection circuit 11. Carry-save adders W2 (12) are several carry-save adders for calculating W[j+1] by adding rW[j] and the output from the 1-digit multiplier 2 (15). Carry-save adders P (16) are several carry-save adders for calculating P[j+1] by adding P[j] and the output from the 1-digit multiplier 1 (13).

An On-the-fly converter (10) is a converter for calculating $S[j+1]^=$ and $S[j+1]^-$ from $S[j]^=$ and $S[j]^-$, which is mainly comprised of selectors.

The 1-digit multiplier 1 (13), carry-save adders W1 (14), 1-digit multiplier 2 (15), and carry-save adders W2 (12) constitute a W updating circuit 21.

When a reciprocal square rooting circuit is to be implemented as a sequential circuit which performs one iteration of Step 2 in each clock cycle, it is comprised of a combinational circuit part and registers. The combinational circuit part is the circuit shown in FIG. 2, with a simple additional circuit for setting initial values to the registers. The following registers are required: registers REG-SE and REG-SM for storing $S[j]^=$ and $S[j]^-$, registers REG-WC and REG-WS for storing W[j], registers REG-PC and REG-PS for storing P[j], and register REG-X for storing X.

Since W[j] and P[j] are in the carry-save form, two registers are required for each of them. In order to avoid variable (j+1-digit) shift of X, $Xr^{-j}$ is stored in the register REG-X and shifted to the right by 1 digit in each clock cycle. This sequential circuit computes an n-digit reciprocal square root in n+1 clock cycles. The clock cycle time is a constant independent of $n$. The amount of hardware is proportional to $n$. It has a regular circuit structure with a digit-slice feature suitable for VLSI implementation.

Obviously, the above circuit can also be implemented as a sequential circuit for performing more than one iteration of Step 2 per clock cycle.

A reciprocal square rooting circuit can be implemented as a combinational circuit by series-connecting a simple circuit for performing Step 1 to ncopies of the circuit for one iteration of Step 2 described above. Shifts are implemented by wiring. The delay (the number of logic gates) of the circuit is proportional to $n$. The amount of hardware is proportional to $n^2$. This circuit has a regular 2-dimensional cellular array structure suitable for VLSI implementation.

2. A hardware algorithm for computing a reciprocal square root for the radix of 2 will be described next.

As a specific example of the algorithm described in "1.", consider a case wherein the radix $r$ is 2, the reciprocal square root digit set is $\{-1, 0, 1\}$, i.e., the redundancy factor ρ is 1, and the residual W[j] and product P[j] are expressed in the carry-save form.

When the radix is 2, the recurrence equations are given as $$S[j+1] := S[j] + q_{j+1}2^{-j-1},$$

$$W[j+1] := 2W[j] - (2P[j] + Xq_{j+1}2^{-j-1})q_{j+1},$$

$$P[j+1] := P[j] + Xq_{j+1}2^{-j-1}$$

Since $\rho=1$, $S[0]=1$, $W[0]=1-x$, and $P[0]=X$ can be set for all X as initial values for $j=0$. In this case, $0<W[0]<3/4$.

To determine a digit selection function, $L_k$ and $U_k$ are obtained first from equations (13) and (14):

$$U_{-1}[j]=0$$

$$L_0[j]=-2P[j]+2^{-j-1}X$$

$$U_0[j]=2P[j]+2^{-j-1}X$$

$$L_1[j]=0$$

Since $X>1/4$, $P[j]>1/4$, and $j \geq 0$, $$\max(L_0[j])<-3/8$$

$$\min(U_0[j])>1/2$$

These values are independent of $P[j]$, $X$, and $j$. According to inequality (15), therefore, $-3/8 < m_0 \leq -2^{-t}$ and $0 < m_1 \leq 1/2 - 2^{-t}$ must be satisfied. By setting $t=2$, $m_0=-1/4$ and $m_1=1/4$ can be obtained, which are independent of $j$.

This radix-2 version of the algorithm is summarized as follows. Since $-2<W[j]<3$, $W[j]$ can be expressed in a two's complement carry-save form with 3-bit integer part (including the sign bit). Therefore, $q_{j+1}$ can be determined from the most significant 6 (6 digits in the carry-save form) bits of $2W[j]$.

Algorithm [RSQRT_R2]

Step 1:
  $S[0]^=:=1$; $S[b \ 0]^-:=0$; $W[0]:=1-X$; $P[0]:=X$;

Step 2:
  for $j:=0$ to $n-1$ do
  {

$$q_{j+1} := \begin{cases} -1 & \text{if } 2W[j]_e \leq -\frac{1}{2} \\ 0 & \text{if } -\frac{1}{4} \leq 2W[j]_e \leq 0; \\ 1 & \text{if } \frac{1}{4} \leq 2W[j]_e \end{cases}$$

($2W[j]_e$: truncation of $2W[j]$ to 2 fractional bits) Calculate $S[j+1]^=$ and $S[j+1]^-$;
  (On-the-fly conversion.)
  $W[j+1]:=2W[j]-(2P[j]+Xq_{j+1}2^{-j-1})q_{j+1}$;
  (Carry-save additions.)
  $P[j+1]:=P[j]+Xq_{j+1}2^{-j-1}$;
  (Carry-save addition.)
  }
$S[n]^=$ is the result.

Figure 3:
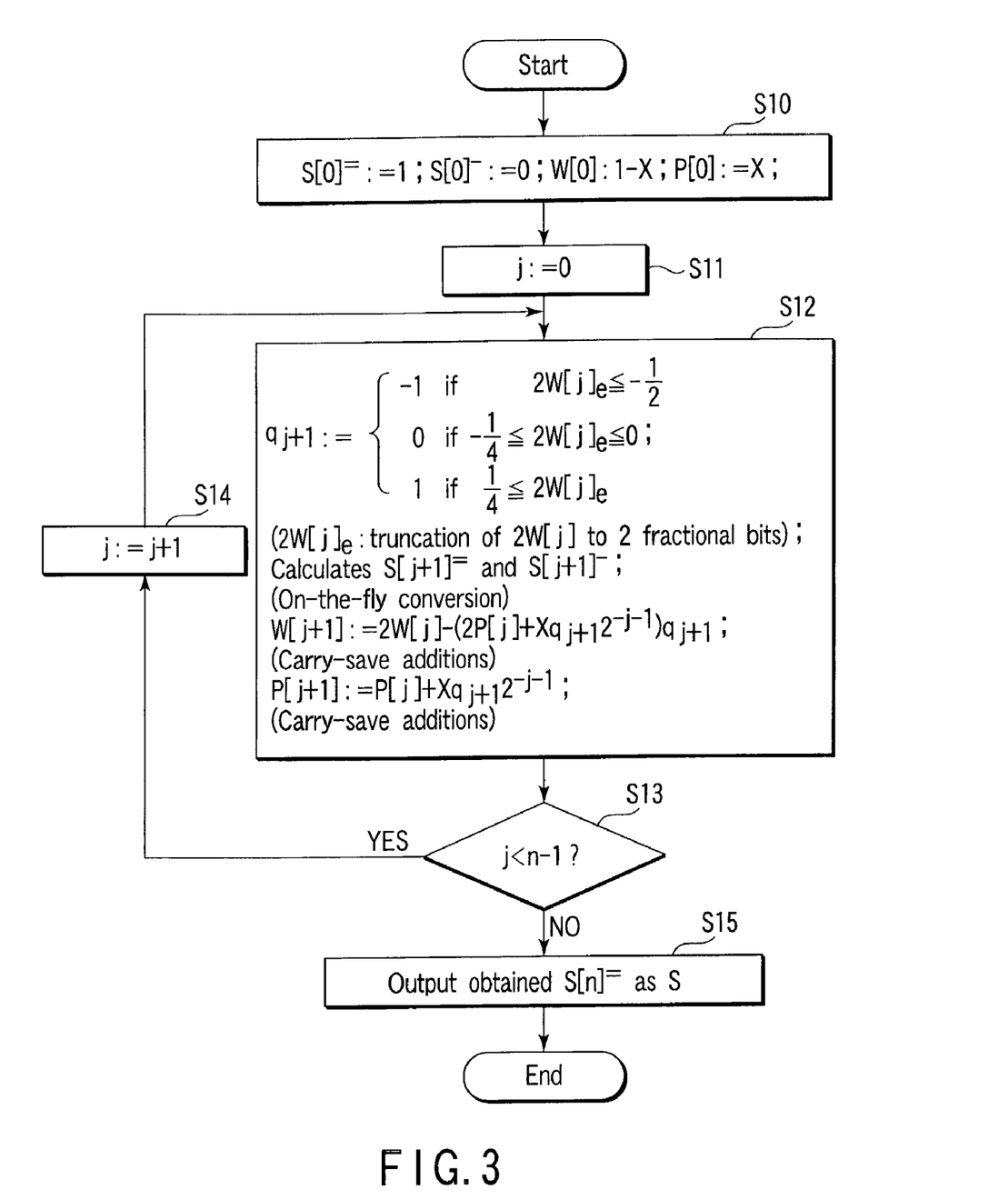
FIG. 3 is a flow chart showing an algorithm for computing a reciprocal square root when the radix is 2.

FIG. 3 is a flow chart showing the algorithm for computing the reciprocal square root described above. First of all, appropriate values are set to the initial values $S[0]$, $W[0]$, and $P[0]$ (step S10). $n$ iterations of the following calculations are performed from $j=0$ to $n-1$ (steps S11 to S14). The reciprocal square root digit $q_{j+1}$ is selected from the digit set $\{-1, 0, 1\}$ in accordance with the estimate of $2W[j]$. Then, $S[j+1]^=$ and $S[j+1]^-$ are obtained by on-the-fly conversion. At the same time, the recurrence equation of the residual $W[j]$, i.e., $W[j+1]:=2W[j]-(2P[j]+Xq_{j+1}2^{-j-1})q_{j+1}$ and the recurrence equation of the product $P[j]$, i.e., $P[j+1]:=P[j]+Xq_{j+1}2^{-j-1}$ are calculated. The obtained value $S[n]^=$ is then output as S to be obtained (step S15).

Consider next implementation of the radix-2 version as a sequential circuit which performs one iteration of Step 2 in each clock cycle. The block diagram of FIG. 4 shows the arrangement of this circuit, which is comprised of several combinational circuit modules and registers.

Figure 4:
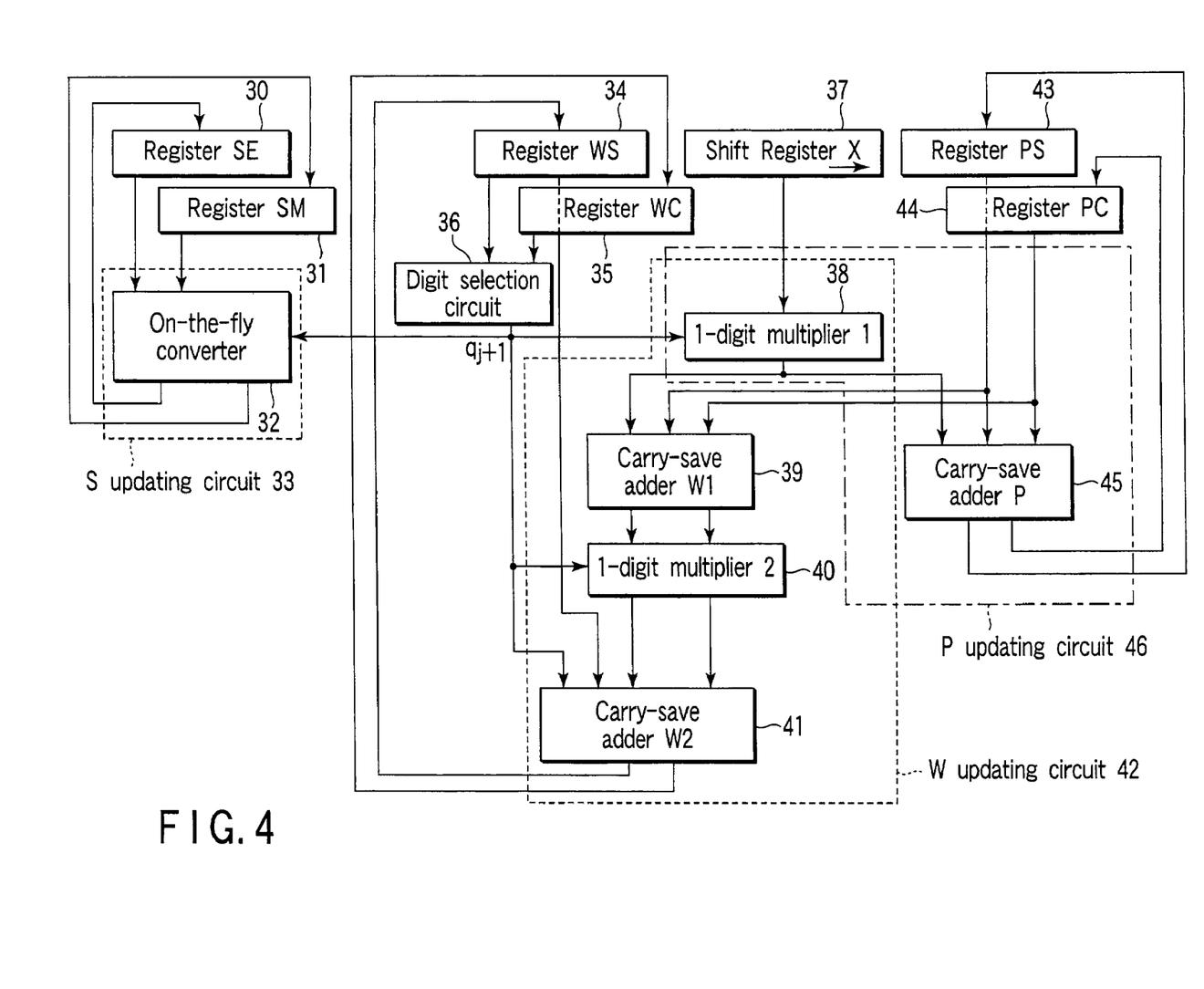
FIG. 4 is a block diagram showing a radix-2 version of a reciprocal square rooting circuit.

As in the arrangement shown in FIG. 2, in the arrangement shown in FIG. 4, a W updating circuit 42 includes, in addition to a digit selection circuit 36, a 1-digit multiplier 1 (38), carry-save adder W1 (39), 1-digit multiplier 2 (40), and carry-save adder W2 (41). A P updating circuit 46 includes the 1-digit multiplier 1 (38) and a carry-save adder P (45). An S updating circuit 33 includes an on-the-fly converter 32.

In addition to the arrangement in FIG. 2, this arrangement includes registers SE (30) and SM (31) for storing the value $S[j]$, registers WS (34) and WC (35) for storing the value $W[j]$, registers PS (43) and PC (44) for storing the value $P[j]$, and a shift register X (37) for storing X.

The digit selection circuit 36 is constituted by a 6-bit carry-propagate adder and a simple constant comparator. This arrangement also requires a buffer for driving $q_{j+1}$. The on-the-fly converter 32 is mainly formed from two 2-to-1 selectors. The 1-digit multipliers 1 (38) and 2 (40) are multiplexers each serving to output 0, data input itself, or the bit-inverted data of the data input.

The carry-save adders W1 (39) and P (45) are carry-save adders, and the carry-save adder W2 (41) is a 4-2 adder. Taking the truncation errors into consideration, $W[j]$ and $P[j]$ should be calculated with $2^{-n-c}$ precision. In this case, $$c \approx \log_2 n$$

3. A radix-4 version of the algorithm for computing a reciprocal square root will be described next.

Consider a case wherein the radix $r$ is 4, the reciprocal square root digit set is $\{-2,-1, 0, 1, 2\}$, i.e., the redundancy factor $\rho$ is $2/3$ and the residual $W[j]$ and product $P[j]$ are expressed in the carry-save form.

When the radix is 4, the recurrence equations are $$S[j+1]:=S[j]+q_{j+1}4^{-j-1},$$

$$W[j+1]:=4W[j]-(2P[j]+Xq_{j+1}4^{-j-1})q_{j+1},$$

$$P[j+1]:=P[j]+Xq_{j+1}4^{-j-1}$$

The following are initial values for $j=0$. When $X<3/8$, $S[0]=2$, $W[0]=1-4X$, and $P[0]=2X$. When $3/8 \leq X<3/4$, $S[0]=3/2$, $W[0]=1-9X/4$, and $P[0]=3X/2$. When $X \geq 3/4$, $S[0]=1$, $W[0]=1-X$, and $P[0]=X$. Although $S[0]=3/2$, $W[0]=1-9X/4$, and $P[0]=3X/2$ can be set for all X, since the same digit selection function as that for $j \geq 1$ can be used for $j=0$, these initial values are used.

To determine a digit selection function, $^{max}P[j]_e(L_k[j])$ and $^{min}P[j]_e(U_k[j])$ are obtained from expressions (17) and (18).

$$^{min}P[j]_e(U_{-2}[j]) > -8/3(P[j]_e + 2^{-d+1}) + 4/9 X \cdot 4^{-j}$$

$$^{max}P[j]_e(L_{-1}[j]) = -10/3 P[j]_e + 25/36 X \cdot 4^{-j}$$

$$^{min}P[j]_e(U_{-1}[j]) > -2/3(P[j]_e + 2^{-d+1}) + 1/36 X \cdot 4^{-j}$$

$$^{max}P[j]_e(L_0[j]) = -4/3 P[j]_e + 1/9 X \cdot 4^{-j}$$

$$^{min}P[j]_e(U_0[j]) = 4/3 P[j]_e + 1/9 X \cdot 4^{-j}$$

$${}^{max}P[j]_e(L_1[j]) < \frac{2}{3}(P[j]_e + 2^{-d+1}) + \frac{1}{36}X \cdot 4^{-j}$$

$${}^{min}P[j]_e(U_1[j]) = \frac{10}{3}P[j]_e + \frac{25}{36}X \cdot 4^{-j}$$

$${}^{max}P[j]_e(L_2[j]) < \frac{8}{3}(P[j]_e + 2^{-d+1}) + \frac{4}{9}X \cdot 4^{-j}$$

When $j \geq 1$, according to inequality (15), the following must be satisfied:

$$-\frac{10}{3}P[j]_e + \frac{25}{144}X < m_{-1}(P[j]_e) \leq -\frac{8}{3}P[j]_e - \frac{16}{3}2^{-d} - 2^{-t},$$

$$-\frac{4}{3}P[j]_e + \frac{1}{36}X < m_0(P[j]_e) \leq -\frac{2}{3}P[j]_e - \frac{4}{3} \cdot 2^{-d} 31 \, 2^{-t},$$

$$\frac{2}{3}P[j]_e + \frac{4}{3} \cdot 2^{-d} + \frac{1}{144}X \leq m_1(P[j]_e - 2^{-t},$$

$$\frac{8}{3}P[j]_e + \frac{16}{3} \cdot 2^{-d} + \frac{1}{9}X \leq m_2(P[j]_e) \leq \frac{10}{3}P[j]_e - 2^{-t}.$$

Since $P[j]_e > X(X^{-1/2} - (\frac{2}{3}) \cdot 4^{-j}) - 2^{-d+1}$ for $j \geq 1$, the following equations can be obtained by setting $d=6$ and $t=4$:

$$m_{-1}(P[j]_e) = -\text{trunc}_4(3(P[j]_e + 2^{-6}))$$

$$m_0(P[j]_e) = -\text{trunc}_4(P[j]_e + 2^{-6})$$

$$m_1(P[j]_e) = \text{trunc}_4(P[j]_e + 2^{-6})$$

$$m_2(P[j]_e) = \text{trunc}_4(P[j]_e + 2^{-6})$$

where $\text{trunc}_4(\ )$ is the truncation to 4 fractional bits.

Consider a case wherein $j=0$. When $X < \frac{3}{8}$, $S[0]=2$ and $W[0]=1-4X$. Therefore, for $m_k(P[j]_e)$ described above, $4W[0]=4-16X > L_{-1}[0]$, $4W[0]_e \geq m_{-1}(P[0]_e)$, ${}^{max}P[0]_e(L_0[0]) < m_0(P[0]_e) < {}^{min}P[0]_e(U_{-1}[0])$, ${}^{max}P[0]_e(L_1[0]) < m_1(P[0]_e) < {}^{min}P[0]_e(U_0[0])$, $4W[0] < U_1[0]$, and $4W[0]^e \leq m_2(P[0]_e) - 2^{-4}$ hold.

When $\frac{3}{8} \leq X < \frac{3}{4}$, $S[0]=\frac{3}{2}$ and $W[0]=1-9X/4$. Therefore, $4W[0]=4-9X > L_{-1}[0]$, $4W[0]_e \geq m_{-1}(P[0]_e)$, ${}^{max}P[0]_e(L_0[0]) < m_0(P[0]_e) < {}^{min}P[0]_e(U_{-1}[0])$, ${}^{max}P[0]_e(L_1[0]) < m_1(P[0]_e) < {}^{min}P[0]_e(U_0[0])$, $4W[0] < U_1[0]$, and $4W[0]^e \leq m_2(P[0]_e) - 2^{-4}$ hold.

When $X \geq \frac{3}{4}$, $S[0]=1$ and $W[0]=1-X$. Therefore, $4W[0]=4-4X > L_{-1}[0]$, $4W[0]_e \geq m_{-1}(P[0]_e)$, ${}^{max}P[0]_e(L_0[0]) < m_0(P[0]_e) < {}^{min}P[0]_e(U_{-1}[0])$, ${}^{max}P[0]_e(L_1[0]) < m_1(P[0]_e) < {}^{min}P[0]_e(U_0[0])$, $4W[0] < U_1[0]$, and $4W[0]_e \leq m_2(P[0]_e) - 2^{-4}$ hold.

In any case, therefore, the same digit selection function as that for $j \geq 1$ can be used, and $q_1$ is selected from $\{-1, 0, 1\}$.

This radix-4 version of the algorithm is summarized as follows. Since $-2 < W[j] < 2$, $W[j]$ is expressed in a two's complement carry-save form with 2-bit integer part (including the sign bit). Since $0 < P[j] < 2$, $P[j]$ is expressed in an unsigned carry-save form with 1-bit integer part. Therefore, $q_{j+1}$ can be determined from the most significant 8 (carry-save) bits of $4W[j]$ and the most significant 7 (carry-save) bits of $P[j]$.

Algorithm [RSQRT_R4]

Step 1:

if $X < \frac{3}{8}$ then do
$\{S[0]^= := 2; S[0]^- := 1; W[0] := 1-4X; P[0] := 2X;\}$
else if $\frac{3}{8} \leq X < \frac{3}{4}$ then do
$\{S[0]^= := \frac{3}{2}; S[0]^- := \frac{1}{2};$
$W[0] := 1-9X/4; P[0] := 3X/2;\}$
else do $\{S[0]^= := 1; S[0]^- := 0; W[0] := 1-X; P[0] := X;\}$ Step 2:

for $j := 0$ to $n-1$ do
$\{$ $q_{j+1} :=$ $$\begin{cases} -2 & \text{if } 4W[j]_e < -\text{trunc}_4(3(P[j]_e + 2^{-6})) \\ -1 & \text{if } -\text{trunc}_4(3(P[j]_e + 2^{-6})) \leq 4W[j]_e < -\text{trunc}_4(P[j]_e + 2^{-6}) \\ 0 & \text{if } -\text{trunc}_4(P[j]_e + 2^{-6}) \leq 4W[j]_e < \text{trunc}_4(P[j]_e + 2^{-6}); \\ 1 & \text{if } \text{trunc}_4(P[j]_e + 2^{-6}) \leq 4W[j]_e < \text{trunc}_4(3(P[j]_e + 2^{-6})) \\ 2 & \text{if } \text{trunc}_4(3(P[j]_e + 2^{-6})) \leq 4W[j]_e \end{cases}$$

($4W[j]_e$: truncation of $4W[j]$ to 4 fractional bits.)
($P[j]_e$: truncation of $P[j]$ to 6 fractional bits.)
Calculates $S[j+1]^=$ and $S[j+1]^-$;
(On-the-fly conversion.)
$W[j+1] := 4W[j] - (2P[j] + Xq_{j+1}4^{-j-1})q_{j+1}$;
(Carry-save additions.)
$P[j+1] := P[j] + Xq_{j+1}4^{-j-1}$
(Carry-save addition)

Figure 5:
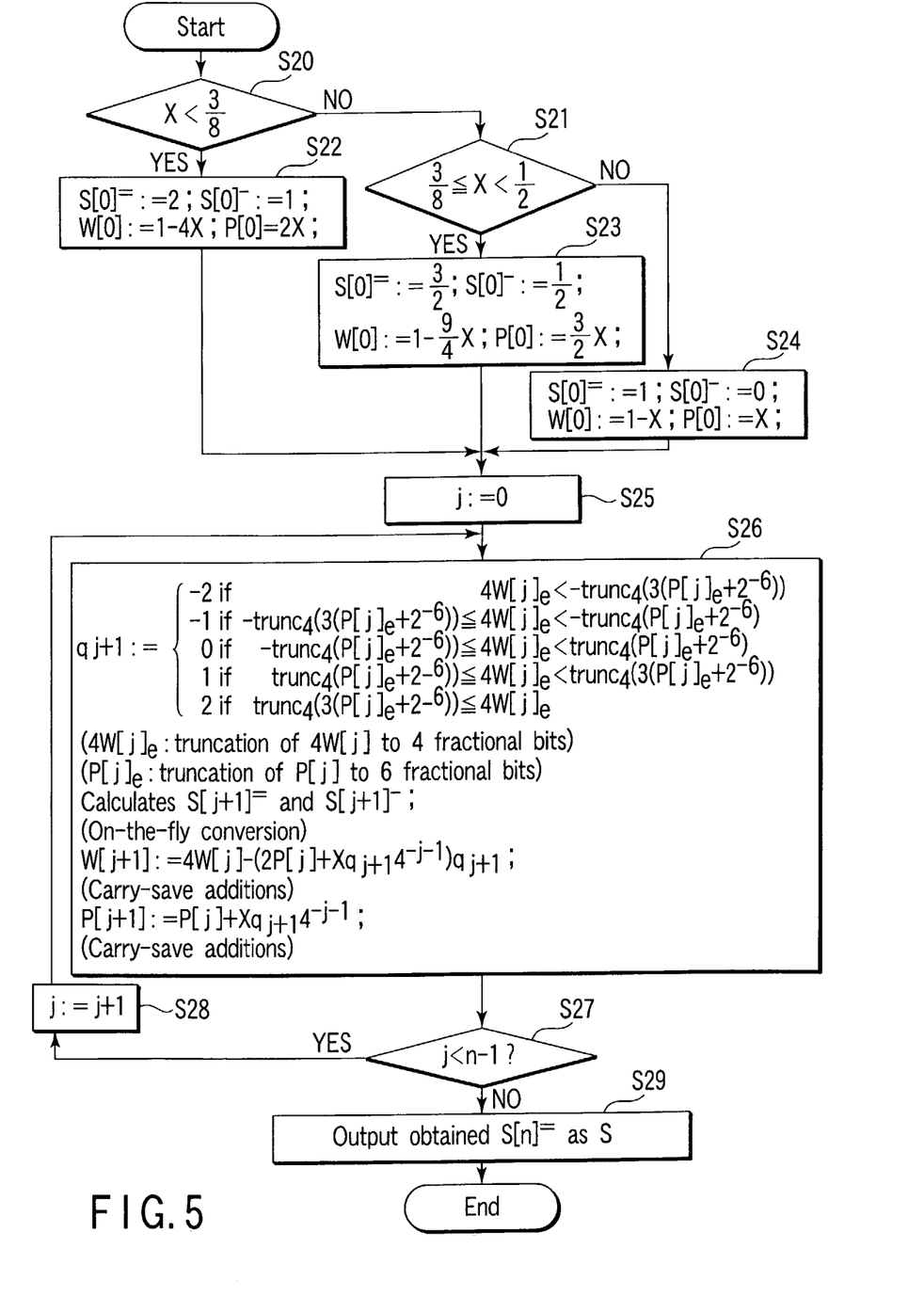
FIG. 5 is a flow chart showing an algorithm for computing a reciprocal square root when the radix is 4.

FIG. 5 is a flow chart showing the above algorithm for computing the reciprocal square root. First of all, it is checked whether the operand X is smaller than $\frac{3}{8}$ (step S20). If the operand X is smaller than $\frac{3}{8}$, 2, $1-4X$, and $2X$ are respectively set as the initial values $S[0]$, $W[0]$, and $P[0]$ (step S22). If the operand X is equal to or larger than $\frac{3}{8}$, it is checked in step S21 whether the operand X is in the range of $\frac{3}{8}$ (inclusive) and $\frac{3}{4}$ (exclusive). If YES in step S21, $\frac{3}{2}$, $1-9X/4$, and $3X/2$ are respectively set as the initial values $S[0]$, $W[0]$, and $P[0]$ (step S23). If NO in step S21, 1, $1-X$, and X are respectively set as the initial values $S[0]$, $W[0]$, and $P[0]$ (step S24).

In this manner, when the radix is 4, appropriate initial values are set for each of the three cases in accordance with the value of X. This allows the same digit selection function as that for $j \geq 1$ to be used for $j=0$ as well.

n iterations of the following calculations are performed from $j=0$ to $n-1$ (steps S25 to S28). The reciprocal square root digit $q_{j+1}$ is selected from the digit set $\{-2, -1, 0, 1, 2\}$ in accordance with the estimate of $4W[j]$ and $P[j]$. Then, $S[j+1]^=$ and $S[j+1]^-$ are obtained by on-the-fly conversion. At the same time, the recurrence equation of the residual $W[j]$, i.e., $W[j+1] := 4W[j] - (2P[j] + Xq_{j+1}4^{-j-1})q_{j+1}$ and the recurrence equation of the product $P[j]$, i.e., $P[j+1] := P[j] + Xq^{j+1}4^{-j-1}$ are calculated. The obtained value $S[n]^=$ is then output as S to be obtained (step S29).

Consider implementation of the radix-4 version as a sequential circuit which performs one iteration of Step 2 in each clock cycle. The circuit structure is the same as that of the sequential implementation of the radix-2 version shown in FIG. 4 except that the most significant bits of $P[j]$ are also input to the digit selection circuit.

The digit selection circuit is a combination of an 8-bit carry-propagate adder, a 7-bit carry-propagate adder, and a 15-input combination circuit. A buffer for driving $q_{j+1}$ is also required. The on-the-fly converter (32) is mainly constituted by a pair of 2-to-1 selectors. The 1-digit multiplier 1 (38) and 1-digit multiplier 2 (40) are multiplexers, which outputs 0, the data input itself, the bit-inverted data of the data input, the double of the data input, or the double of the bit-inverted data of the data input. The carry-save adder P (45) and carry-save adder W1 (39) are carry-save adders, and the carry-save adder W2 (41) is a 4-to-2 adder.

According to the embodiment described above, unlike a conventional reciprocal square rooting circuit of a multiplication type based on Newtonian laws or a simple combination of a divider and a square root extractor, a reciprocal square root is directly calculated by iterations of simple calculation, i.e., shifts, additions/subtractions, and 1-digit multiplication, without obtaining the reciprocal square root of an operand. The circuit according to the embodiment is therefore smaller than the circuit of the multiplication type, and faster than a simple combination of a divider and a square root extractor.

In addition, according to a method of superposing division and square root extraction by combining dividers and square root extractors, the latency becomes higher than division and square root extraction. In the present invention, however, the latency can be made equal to division and square root extraction.

According to the present invention, there are provided a method of computing a reciprocal square root, a reciprocal square rooting circuit, and a program, which realize a smaller amount of hardware than a conventional multiplication type reciprocal square rooting circuit and also realize faster operation than a conventional reciprocal square rooting circuit using dividers and square root extractors.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A reciprocal square rooting circuit for computing a reciprocal square root S[n] for a radix of $r$ by using a partial result S[j], a residual W[j], and a product P[j] of an operand X and the partial result S[j] after j iterations of calculation, comprising:

as components of a circuit for performing one iteration of n iterations of calculation for j=0 to n−1 by using predetermined recurrence equations, a digit selection circuit which determines a reciprocal square root digit $q_{j+1}$ from values of most significant several bits of rW[j] and P[j];

a first 1-digit multiplier which generates $Xq_{j+1}$ by multiplying the operand X by an output from the digit selection circuit;

a first carry-save adder which adds 2P[j] and an output from the first 1-digit multiplier;

a second 1-digit multiplier which multiplies an output from the first carry save adder by an output from the digit selection circuit;

a second carry save adder which calculates W[j+1] by adding rW[j] and an output from the second 1-digit multiplier;

a third carry-save adder which adds P[j] and the output from the first 1-digit multiplier; and a converter which converts S[j] into S[j+1] in accordance with the output from the digit selection circuit.

2. A circuit according to claim 1, further comprising a register to store a value of S[j], a register to store a value of W[j], and a register to store a value of P[j].

* * * * *

UNITED STATES PATENT AND TRADEMARK OFFICE
CERTIFICATE OF CORRECTION

PATENT NO.       : 7,266,578 B2                                     Page 1 of 1
APPLICATION NO.  : 10/160966
DATED            : September 4, 2007
INVENTOR(S)      : N. Takagi It is certified that error appears in the above-identified patent and that said Letters Patent is hereby corrected as shown below:

| COLUMN | LINE | ERROR |
|---|---|---|
| 14 (Claim 1, line 18) | 17 | "carry save" should read --carry-save-- |
| 14 (Claim 1, line 20) | 20 | "carry save" should read --carry-save-- |

Signed and Sealed this

Twenty-fourth Day of June, 2008

JON W. DUDAS
*Director of the United States Patent and Trademark Office*